Nov. 21, 1933.  C. R. KUZELL  1,936,092
ZINC METALLURGY
Filed Feb. 25, 1929
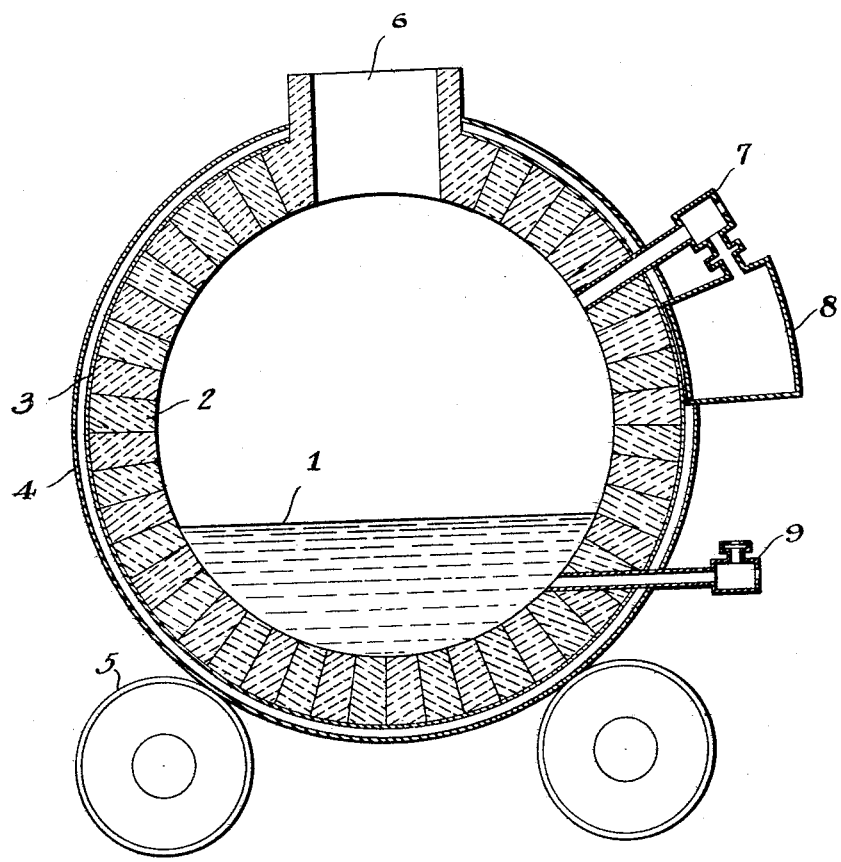
Inventor.
Charles R. Kuzell Patented Nov. 21, 1933

1,936,092

UNITED STATES PATENT OFFICE 1,936,092

ZINC METALLURGY

Charles R. Kuzell, Clarkdale, Ariz., assignor to United Verde Copper Company, Clarkdale, Ariz., a corporation of Delaware Application February 25, 1929. Serial No. 342,608

2 Claims. (Cl. 75—28)

This invention relates to zinc metallurgy and has for an object the provision of an improved method for recovering zinc from zinc-bearing materials. More particularly, the invention contemplates the provision of an improved method for recovering zinc from molten baths of zinc-bearing materials such, for example, as mattes and slags.

According to the method of the invention, a reducing agent, in an amount in excess of that required to reduce the zinc compounds contained in the bath, is injected into a molten bath of zinc-bearing material in a suitable receptacle to produce and vaporize metallic zinc, and an oxidizing gas such as air is introduced into the receptacle above the surface of the bath to oxidize the excess reducing agent and the zinc vapor and produce a fume containing zinc oxide and to generate heat for maintaining the bath molten. The fume produced may be collected in any suitable manner.

For carrying out the method of the invention, I prefer to employ a vessel or receptacle similar in type to a copper converter, upright or horizontal, but any vessel or furnace, tiltable or stationary, which can hold a liquid bath and which can be equipped with tuyere means for injecting a reducing agent into the bath and other tuyere means for introducing oxidizing gas above the bath may be employed satisfactorily.

The reactions that take place during injection of fuels through liquid mattes or slags are frequently endothermic which condition results in rapid cooling of the bath. Since it is necessary to maintain the bath in a fluid state, sufficient of the fuel must be burned with air to supply heat necessary to maintain the temperature. One means that suggests itself to this end is to blow in air with the fuel through the injection tuyeres in sufficient quantity to supply this heat by partial combustion of the fuel. However, this is decidedly objectionable for two reasons: first, because decrease in concentration of reducing agent by dilution with oxidizing agent of a necessity lowers the efficiency of reduction since the oxygen can combine with metals or sulphides in the bath as readily as with the fuel, thus it is seen that a minimum of air for injection is desirable; secondly, even if sufficient air is to be used in injection to supply the heat necessary, the equilibria of the reduction reactions are such that a large amount of CO will still be present in the gases leaving the bath and will pass from the vessel unconsumed. This means is decidedly inefficient in respect to the fuel since it decreases the reducing effect and still allows unconsumed gas to escape.

In carrying out the process of my invention in apparatus of the type described above, I inject the fuel, if solid or liquid, with minimum air or steam. The higher the pressure used, the less the actual quantity necessary. Gaseous fuels, of course, may be blown in with no air or steam. Then I burn the unconsumed fuel above the bath by blowing in air through the upper row of tuyeres, thus supplying the heat necessary to maintain the temperature. I may control the temperature by varying the rate of injection of the fuel and at the same time the air through the upper row of tuyeres and still not permit unconsumed fuel gas to escape from the furnace. This will not affect the efficiency of reduction since the gases that are burned above the bath are outside the zone of reduction. Also the volatilized elements are burned to oxides above the bath and this heat made available for maintaining the temperature of the bath; while the oxides pass from the vessel as gases or fume where they may be collected by any of the common methods.

Suitable apparatus for carrying out the method of the invention is illustrated in the accompanying drawing.

The apparatus shown in the drawing comprises a vessel of the horizontal converter type having a steel shell 3 provided with a refractory lining 2 preferably formed of magnesite brick. The vessel is provided with riding rings 4 (only one of which is shown) which engage foundation wheels 5 on which the vessel is mounted. An opening or mouth 6 is provided to permit charging and discharging. The vessel is provided with an injection tuyere 9 which communicates with the interior of the vessel at a point below the level of a normal bath charge 1 shown therein. Any suitable number of injection tuyeres may be provided. The injection tuyeres may be connected at their outer ends with any suitable source of reducing agent and/or injecting agent (not shown). A tuyere 7 communicates with a windbox 8 and the interior of the vessel at a point above the normal bath level to provide for the introduction of secondary air or other suitable oxidizing gas. Any suitable number of tuyeres for introducing oxidizing gas into the vessel above the bath may be provided. Suitable means (not shown) may be provided for tilting the vessel to permit charging and discharging.

The tuyeres may enter the vessel horizontally when the vessel is upright, though the angle with the bath and their depth below the surface of the bath may be varied by varying the amount of charge and the angle of the vessel. The number and size of the injection tuyeres will, of course, depend on the size of the vessel. In case of a small vessel the connections to the injection tuyeres may be by means of flexible metal hose, while in a larger vessel the best arrangement is by means of the usual windbox for all the tuyeres, connected by means of a goose neck at one end with the fuel and air supply. Each tuyere may have a punching valve, so the tuyeres may be cleaned out during the operation. Of course, the fuel supply should be shut off while punching the tuyeres, but since I use high pressure gas and small tuyeres, little or no punching is required during the operation as long as the bath temperature is maintained sufficiently high.

The secondary air tuyeres (7) with windbox (8) are in a row above the injection tuyeres and their inside ends are at such elevation that combustion of inflammable gases or vapors rising from the bath will allow heat to be radiated down onto the bath and assist in keeping it molten. Connections to these tuyeres may be by flexible hose in a small installation or by wind box in a larger one. The openings or inlets for secondary air need not essentially be tuyeres, the principle of the invention being served if the secondary air enters above the bath near enough to radiate heat to the bath.

The connection arrangement to the injection tuyeres will be different for different fuels. For pulverized coal, for instance, the wind box should be as small as is consistent with quantity of fuel to be delivered so a high velocity may be maintained and keep maximum ratio of coal to air. In using oil, separate lines for oil and air or steam are necessary. In using gaseous fuel, as producer gas or water gas, the wind box should be quite large, of course.

I claim:

1. The improvement in zinc metallurgy which comprises injecting a carbonaceous reducing agent by means of steam into a molten bath containing a zinc compound in a suitable receptacle to reduce the zinc compound and produce and vaporize metallic zinc, the amount of reducing agent injected being in excess of that required to reduce the zinc compound, introducing air into the receptacle above the surface of the bath to oxidize the excess reducing agent and the zinc vapor and produce a fume containing zinc oxide and to generate heat for maintaining the bath molten, and collecting the fume.

2. The improvement in zinc metallurgy which comprises injecting a carbonaceous reducing agent by means of a gaseous carrier substantially devoid of free oxygen into a molten bath containing a zinc compound in a suitable receptacle to reduce the zinc compound and produce and vaporize metallic zinc, the amount of reducing agent injected being in excess of that required to reduce the zinc compound, introducing air into the receptacle above the surface of the bath to oxidize the excess reducing agent and the zinc vapor and produce a fume containing zinc oxide and to generate heat for maintaining the bath molten, and collecting the fume.

CHARLES R. KUZELL.